Aug. 10, 1926.
E. A. SUTHERLAND
1,595,694
RADIATOR GAUGE
Filed Sept. 18, 1924
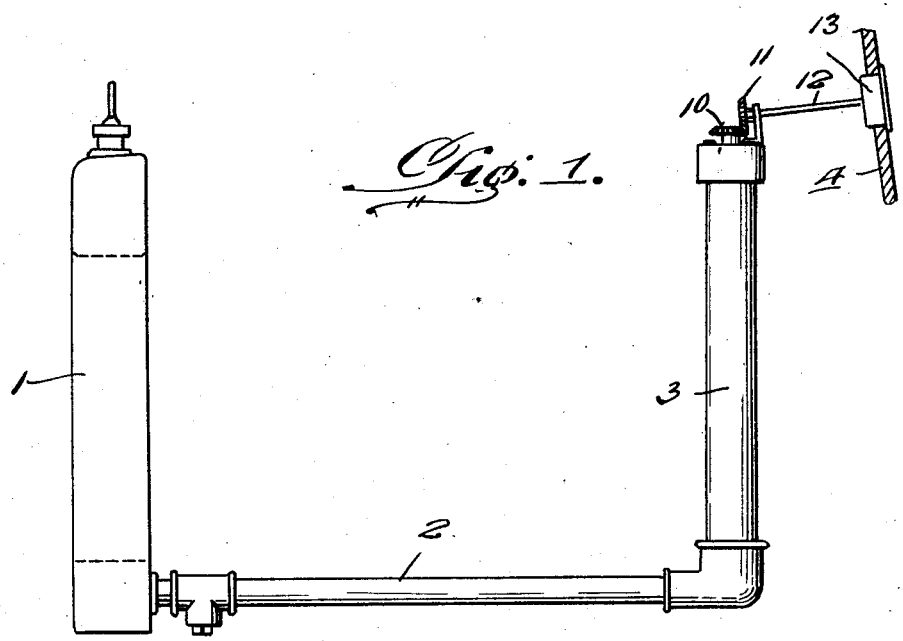
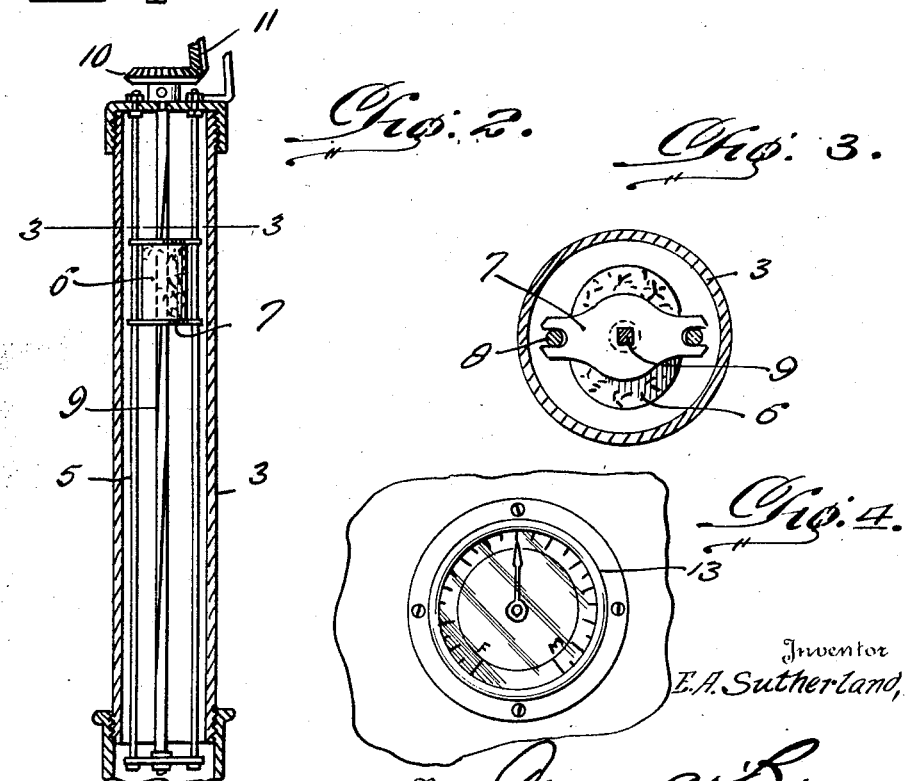
Inventor
E. A. Sutherland,
By Clarence A. O'Brien
Attorney Patented Aug. 10, 1926.

1,595,694

UNITED STATES PATENT OFFICE.

ELIJAH A. SUTHERLAND, OF CARIBOU, MAINE.

RADIATOR GAUGE.

Application filed September 18, 1924. Serial No. 738,499.

This invention relates to water gauge devices, especially adapted for use in conjunction with the radiator of an automobile machine, and it consists in the novel features hereinafter described and claimed.

An object of the invention is to provide a gauge of the simple and durable construction, adapted to be connected with the radiator and which will indicate at the dash board of a machine, the level of the water which is contained within the radiator.

With the above object in view, the structure includes a cylinder, which is connected by means of a conduit pipe with the lower portion of the radiator, and having a float movably mounted therein, there being a shaft journaled in the cylinder and provided with parallel threads, the said shaft passing through the float and adapted to be turned by the float, as the float rises and falls in the cylinder. The said shaft is positively connected with an indicator, which is mounted upon the dash board of an automobile machine.

In the accompanying drawing:

Figure 1 is a side elevational view of the water gauge structure.

Figure 2 is a vertical sectional view thru the cylinder thereof.

Figure 3 is a transverse sectional view thru the cylinder, cut on the line 3—3 of Figure 2.

Figure 4 is a front elevational view of the gauge.

As illustrated in the accompanying drawing, the radiator 1 is connected by means of a conduit pipe 2, with a vertically disposed cylinder 3. The cylinder 3 is disposed adjacent the dash board 4 of the automobile machine. Space rods 5 are disposed within the cylinder 3 and are held in fixed position with relation to each other. A float 6 is mounted for vertical movement between the rods 5 and is housed within the cylinder 3. The said float 6 is provided at its upper and lower ends with plates 7 having at their opposite ends recesses 8, which receive the rods 5. The shaft 9 is journaled for rotation in the cylinder 3, and is disposed between the rods 5. The said shaft 9 is non-circular in transverse section and is preferably square and the said shaft passes through corresponding openings provided at intermediate points of the plate 7. This shaft 9 is twisted to be of a spiral formation. A bevelled pinion 10 is carried at the upper end of the shaft 9 and is in mesh with the teeth of a bevelled pinion 11, which is mounted upon a shaft 12 disposed above the cylinder 3 and which is operatively connected with the indicator 13. The indicator is mounted upon the dash board 4 of the automobile machine.

As the level of the water in the radiator 1 rises and falls, the float 6 in the cylinder 3 will move accordingly along the rods 5 and carry with it the plate 7. Inasmuch as the openings at the intermediate portions of the said plates snugly receive the side wall surfaces of the shaft 9, the said shaft, is turned as the float 6 rises and falls. Therefore, rotary movement is transmitted by the intermeshing pinions 10 and 11 of the shaft 12, which actuates the hand of the indicator 13, and the movement of the said hand will indicate to the driver of the machine, approximately, the level of the water which is contained within the radiator.

Having thus described the invention, what is claimed is:

1. A water level indicator including a cylinder having an externally threaded open upper end and an externally threaded lower open end, a cap threadedly engaged on the upper open end, a pair of guide rods passing through the cap and depending into the cylinder and terminating below the lower open end thereof, a plate connecting the lower ends of the rods, a twisted shaft polygonal in cross section except at its ends one of which is journaled in the plate and the other in the cap through which it extends, a float having notched plates on the ends thereof for association with the guide rods, and being apertured so as to receive and turn said shaft when the float moves longitudinally thereof, a beveled gear on the upper end of the shaft above the cap, a bracket of L-shaped formation having its lower extremity engaged with the outer end of one of the rods, a shaft journaled through the other extremity of the bracket, and a bevel gear on the last mentioned shaft meshing with the first mentioned beveled gear.

2. In combination, an automobile radiator, a pipe leading horizontally from the bottom of the radiator, a cylinder rising vertically from the end of the horizontal pipe, a pair of spaced parallel guide rods, means for mounting the rods in the cylinder to extend longitudinally therein, a spiral square shaft, means for rotatably mounting the shaft to extend longitudinally through the cylinder between the guide rods, a float in the cylinder for rising and falling therein with the level of the water in the radiator, means on the float engaging the guide rods and having an opening for receiving the shaft for causing the latter to turn upon movement of the float in the cylinder, a dash board, an indicating device mounted on the dash board, a shaft leading from the indicating device, a bracket on the cylinder, said second shaft being journaled thru said bracket, and gearing between the second shaft and the first shaft.

In testimony whereof I affix my signature.

ELIJAH A. SUTHERLAND.